United States Patent
Ahn et al.

(10) Patent No.: US 11,668,573 B2
(45) Date of Patent: *Jun. 6, 2023

(54) MAP SELECTION FOR VEHICLE POSE SYSTEM

(71) Applicant: UATC, LLC, San Francisco, CA (US)

(72) Inventors: Rachel Ahn, Pittsburgh, PA (US);
David Prasser, Pittsburgh, PA (US);
Peter Hansen, Pittsburgh, PA (US);
Robert Zlot, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 143 days.

This patent is subject to a terminal disclaimer.

(21) Appl. No.: 17/305,375

(22) Filed: Jul. 6, 2021

(65) Prior Publication Data

US 2021/0333111 A1 Oct. 28, 2021

Related U.S. Application Data

(63) Continuation of application No. 15/987,534, filed on May 23, 2018, now Pat. No. 11,073,403.

(60) Provisional application No. 62/617,012, filed on Jan. 12, 2018.

(51) Int. Cl.
*G01C 21/30* (2006.01)
*G01C 21/32* (2006.01)
*G01S 19/45* (2010.01)

(52) U.S. Cl.
CPC ............ *G01C 21/32* (2013.01); *G01C 21/30* (2013.01); *G01S 19/45* (2013.01)

(58) Field of Classification Search
CPC ...... B60W 40/00; B60W 30/00; B60W 60/00; B60W 2555/00; B60W 2900/00; B60W 10/00; B60W 20/00; G01C 21/32; G01C 21/30; G01C 19/45; G01C 21/3673; G01C 21/34; G01C 21/36; G01C 21/3629; G01C 21/20; G01C 21/3605; G01C 21/3652; G01S 19/45
USPC ........................................................ 701/412
See application file for complete search history.

(56) References Cited

U.S. PATENT DOCUMENTS

| | | |
|---|---|---|
| 2017/0030722 A1 | 2/2017 | Kojo |
| 2017/0166216 A1 | 6/2017 | Rander et al. |
| 2019/0155303 A1* | 5/2019 | Kawabe ............ B60W 50/0097 |
| 2019/0219404 A1 | 7/2019 | Ahn et al. |

(Continued)

OTHER PUBLICATIONS

U.S. Appl. No. 15/987,534, filed May 23, 2018, Map Selection for Vehicle Pose System.

(Continued)

*Primary Examiner* — Abby Y Lin
*Assistant Examiner* — Hossam M Abd El Latif
(74) *Attorney, Agent, or Firm* — Schwegman Lundberg & Woessner, P.A.

(57) ABSTRACT

Various examples are directed to systems and methods for locating a vehicle. A pose state estimator may access a previous position for the vehicle at a first time, wherein the previous position is on a first sub-map of a plurality of sub-maps. The pose state estimator may receive from a first localizer a first position estimate for the vehicle at a second time after the first time. The first position estimate may be on a second sub-map of the plurality of sub-maps. The pose state estimator may send to a second localizer a sub-map change message indicating the second sub-map.

20 Claims, 9 Drawing Sheets

(56) References Cited

U.S. PATENT DOCUMENTS

2020/0363212 A1 11/2020 Suzuki et al.
2020/0400443 A1* 12/2020 Pazhayampallil .... H04W 4/024

OTHER PUBLICATIONS

"U.S. Appl. No. 15/987,534, Notice of Allowance dated Mar. 25, 2021", 9 pgs.

Levinson, Jesse, et al., "Map-Based Precision Vehicle Localization in Urban Environments", Robotics: Science and Systems. vol. 4, (2007), 8 pgs.

Levinson, Jesse, et al., "Robust vehicle localization in urban environments using probabilistic maps", Robotics and Automation (ICRA), 2010 IEEE International Conference on. IEEE, (2010), 4372-4378.

Wang, Yiyin, et al., "Tracking an asynchronous sensor with Kalman filters", Wireless Communications & Signal Processing (WCSP), 2012 International Conference on. IEEE, (2012), 4 pgs.

* cited by examiner

MAP SELECTION FOR VEHICLE POSE SYSTEM

CLAIM FOR PRIORITY

This application is a continuation of U.S. application Ser. No. 15/987,534, filed May 23, 2018, which claims the benefit of priority of U.S. Provisional Application No. 62/617,012, filed Jan. 12, 2018, each of which is hereby incorporated by reference in their entireties.

FIELD

The document pertains generally, but not by way of limitation, to devices, systems, and methods for determining a position and/or attitude describing a vehicle.

BACKGROUND

An autonomous vehicle is a vehicle that is capable of sensing its environment and operating some or all of the vehicle's controls based on the sensed environment. An autonomous vehicle includes sensors that capture signals describing the environment surrounding the vehicle. The autonomous vehicle processes the captured sensor signals to comprehend the environment and automatically operates some or all of the vehicle's controls based on to the resulting information.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DESCRIPTION

Figure 1:
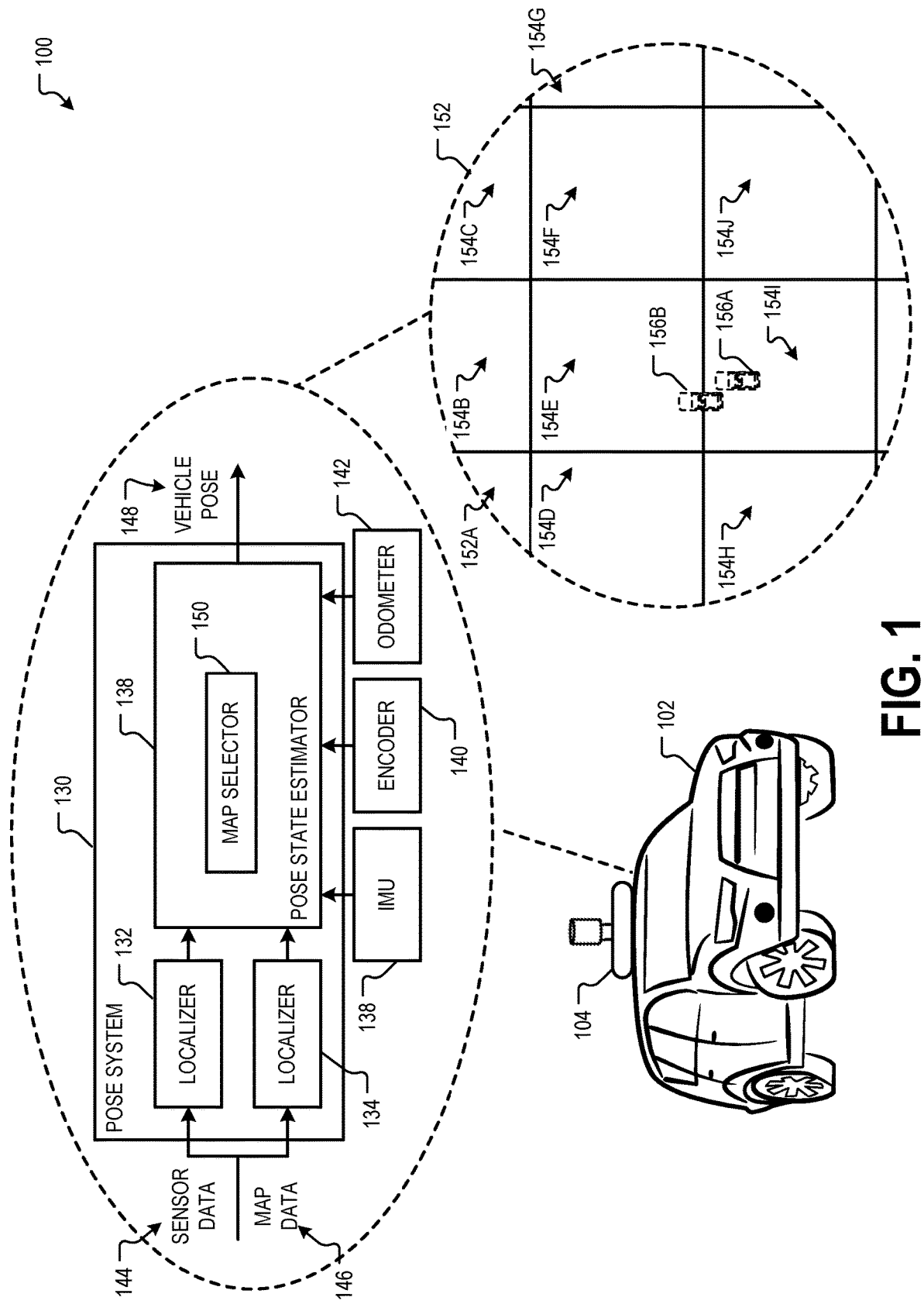
FIG. 1 is a diagram showing one example of an environment including a vehicle having a pose system.

Examples described herein are directed to a pose system for a vehicle. The pose system determines a vehicle pose for the vehicle at different times. A vehicle pose includes a position of the vehicle in a three-dimensional space and/or an attitude of the vehicle, as described herein. The pose system comprises a pose state estimator (sometimes also referred to as a pose filter) and one or more localizers. A localizer receives remote sensor data from one or more remote detection sensors such as, for example, a camera, pair of stereoscopic cameras, a LIDAR (light detection and ranging), and/or a RADAR (radio detection and ranging). The localizer matches remote sensor data to a map. The map corresponds to a geographic area and includes descriptions of features of the geographic area, for example, derived from sensor data or similar data. For example, the map may include features of the geographic area that can be sensed by one or more remote detection sensors, as described herein. The localizer matches remote sensor data to a point on the map to determine a pose estimate for the vehicle.

Different localizers may match remote sensor data to different maps. For example, a geometric localizer matches remote sensor data to objects in the geometric area and indicated by a geometric map. Example objects indicated in a geometric include buildings, trees, etc. A ground intensity localizer matches remote sensor data indicating ground intensity to a ground intensity map. Ground intensity may indicate the reflectivity of points on the ground that reflect LIDAR or other remote sensor data. A ground intensity map indicates the reflectivity of ground surfaces such as, for example, roads, grass, etc.

The pose state estimator receives pose estimates from one or more localizers and generates vehicle poses. Each vehicle pose generated by the pose state estimator describes the vehicle at a particular point in time, referred to herein as a time stamp. In various examples, the pose state estimator generates vehicle poses periodically. For example, time stamps may occur every 100 milliseconds, etc. The pose state estimator, in some examples, generates vehicle poses more frequently than the various localizers generate pose estimates. That is, vehicle poses for some time stamps may be based on a pose estimate describing that time stamp while others may not. For time stamps that are not described by a pose estimate, the pose state estimator determines a vehicle pose, for example, based on motion sensor data as well as, for example, previous vehicle poses, previous pose estimates, etc. Example motion sensors include accelerometers, gyroscopes, encoders, odometers, etc. The pose state estimator determines a pose for the vehicle considering received pose estimates and motion sensor data.

Maps used by various localizers are divided into sub-maps. For example, it can be impractical for a localizer to compare remote sensor data to all possible data in a full map of a large geographic area, such as a city or larger area. Instead, localizers find pose estimates by comparing remote sensor data to sub-units of a full map, referred to as sub-maps. A sub-map area is a portion of a larger geographic area that corresponds to a particular sub-map. To accurately estimate the vehicle's pose, it is desirable for the localizers to match the remote sensor data to the sub-map that describes the vehicle's current position. As the vehicle moves from one sub-map area to another, however, the sub-map describing its current position changes. Various examples described herein are directed to systems and methods for determining when to change sub-maps and to selecting new sub-maps, for example, in pose systems that include more than one localizer.

In some examples, the pose system changes sub-maps when a localizer determines that a sub-map change is appropriate. For example, when one of the localizers selects a new sub-map, the change (including an indication of the new sub-map) is propagated to other localizers in the pose system. A localizer may receive remote sensor data and attempt to match the remote sensor data to a current sub-map to generate a candidate pose estimate. If an error of the candidate pose estimate is above a threshold error, the localizer attempts to match the same remote sensor data to one or more other sub-maps (e.g., adjacent to the current sub-map). If a better match is found, the localizer returns the better match as its pose estimate, along with an indication of the new sub-map. When the pose state estimator receives a pose estimate with an indication of a new sub-map different than the current sub-map, it sends a sub-map change message to one or more other localizers of the pose system. The sub-map change message instructs the other localizers to begin matching remote sensor data to the new sub-map (or a sub-map corresponding to the sub-map area of the new sub-map) rather than the old sub-map. In some examples, all of the localizers in the pose system are arranged to prompt a sub-map change in this way. In other examples, less than all of the localizers are arranged to prompt a sub-map change. For example, a first localizer may be arranged to initiate a sub-map change while a second localizer is not.

In some examples, a localizer arranged to initiate a sub-map change selects a sub-map by matching remote sensor data to two or more (e.g., adjacent) sub-maps. For example, the localizer matches remote sensor data to a first sub-map to generate a first sub-map pose estimate for the vehicle and to a second sub-map to generate a second sub-map pose estimate for the vehicle. In some examples, the localizer also matches the remote detection data to other sub-maps to make additional sub-map pose estimates. The localizer or pose state estimator selects a sub-map for the vehicle based on which match was most successful. For example, the localizer may also generate a covariance indicator for the first sub-map pose estimate and for the second sub-map pose estimate. A covariance indicator describing a pose estimate indicates a level of confidence in the pose estimate. In some examples, the covariance indicator describes more than one dimension including, for example, spatial dimensions, (x position, y position, z position) and attitude dimensions (e.g., pitch, roll, yaw). The covariance indicator may include a matrix or vector, with different scalars of the matrix or vector indicating covariance for different dimensions. The localizer, or pose state estimator, may select one of the tested sub-maps based on which pose estimate indicates the highest level of confidence. When the covariance indicators are multidimensional, the localizer or pose state estimator compares an aggregation of the covariance indicators taken over some or all dimensions.

In some examples, the pose state estimator is arranged to select sub-maps for the pose system. For example, the pose state estimator uses motion sensor data to extrapolate new vehicle poses from previous vehicle poses. For example, the pose state estimator may generate a first vehicle pose considering a pose estimate from a first localizer. The first vehicle pose describes the vehicle at a first time. The pose state estimator then uses motion sensor data and/or a trajectory of the vehicle to determine a second vehicle pose at a second time after the first time. The pose state estimator compares the location of the second vehicle pose to a boundary of the current sub-map. If the location of the second pose is outside the current sub-map, the pose state estimator determines that the current sub-map should be changed to a new sub-map reflecting the location of the second pose. The pose state estimator sends a change message to the various localizers indicating that the current sub-map has changed and indicating a new sub-map. The localizers may respond by generating pose estimates from the new sub-map.

In some examples, the pose state estimator selects a sub-map based on sub-map pose estimates received from multiple localizers. For example, a first localizer matches first remote sensor data to a first sub-map to generate a first sub-map pose estimate for the first localizer. The first localizer also matches the first remote sensor data to a second sub-map to generate a second sub-map pose estimate for the first localizer. In some examples, the first localizer also matches the first remote detection data to other sub-maps to generate additional sub-map pose estimates. A second localizer matches second remote sensor data to the first sub-map and to the second sub-map to generate first and second sub-map pose estimates for the second localizer. In some examples, the second localizer also matches the second remote sensor data to other sub-maps to generate other pose estimates for the second localizer. The pose estimates along with corresponding covariance indicators, are provided to the pose state estimator, which selects one of the tested sub-maps as the current sub-map for the vehicle by comparing the covariance indicators of the pose estimates. For example, the sub-map corresponding to pose estimates with the lowest overall covariance may be selected as the current sub-map. In some examples, the first and second remote sensor data may be collected from the same remote detection sensors, for example, at different times. Also, in some examples, the first and second remote sensor data may be collected from different remote detection sensors, as the same time, or at different times.

Autonomous vehicles may utilize a pose system as described herein. In some examples, a pose system as described herein may be used to determine poses for non-autonomous vehicles, for example, in other contexts. Also, when examples described herein generate or otherwise use a pose, it will be appreciated that not all of a pose is necessarily generated or used. For example, some examples generate and/or use only a vehicle position (e.g., without also determining and/or using the vehicle attitude). Also, some examples generate and/or use only a vehicle attitude. Also, as described herein, generating a vehicle pose may include generating a position and an attitude for the vehicle.

FIG. 1 is a diagram showing one example of an environment 100 including a vehicle 102 having a pose system 130. The vehicle 102, in some examples, is a self-driving vehicle (SDV) or autonomous vehicle (AV) comprising a vehicle autonomy system (FIG. 2) for operating the vehicle without human intervention. In some examples, the vehicle 102 also, in addition to or instead of a full autonomous mode, includes a semi-autonomous mode in which a human user is responsible for some or all control of the vehicle.

The vehicle 102 comprises one or more remote detection sensors 104 that receive return signals from the environment 100. Return signals may be reflected from objects in the environment 100, such as the ground, buildings, trees, etc. The remote detection sensors 104 may include one or more active sensors, such as a LIDAR or RADAR, that emit electromagnetic radiation in the form of light or radio waves to generate return signals. In some examples, the remote detection sensors 104 include a passive sensor, such as a set of stereoscopic cameras, that receive reflected ambient light or other radiation.

The pose system 130 receives remote sensor data 144 and map data 146. Remote sensor data 144 is or is based on the output of one or more remote detection sensors 104. Map data 146 describes a sub-map that is to be matched to the remote sensor data 144. Localizers 132, 134 utilize the remote sensor data 144 and the map data 146 to generate pose estimates that are provided to the pose state estimator 138. The pose state estimator 138 also receives motion sensor data from one or more motion sensors such as, for example, an inertial measurement unit (IMU), one or more encoders, such as encoder 140, an odometer 142, a global navigation satellite system (GNSS) such as global positioning system (GPS) receiver, etc. Based on the pose estimates received from the localizers 132, 134 and the motion sensor data, the pose state estimator 138 determines vehicle poses for various time stamps. Although two localizers 132, 134 are shown in FIG. 1, more or fewer localizers may be used.

FIG. 1 also shows a geographic area 152 including various sub-map areas 152A, 152B, 152C, 152D, 152E, 152F, 152G, 152H, 152I, 152J. Each sub-map area 152A-J corresponds to one or more sub-maps used by the localizers 132, 134. For example, when the vehicle 102 is in a particular sub-map area 152A-152J, localizers 132, 134 utilize sub-maps corresponding to the particular sub-map area 152A-152J. Although the sub-map areas 152A, 152J are regularly-shaped, in various examples, sub-map areas are irregularly-shaped. For example, sub-map areas may be shaped to match terrain. As the vehicle 102 moves from one sub-map area to another, the localizers 132, 134 utilize different sub-maps. For example, when the vehicle 102 is in vehicle position 156A, the localizers 132, 134 utilize sub-maps corresponding to sub-map area 154I.

As the vehicle 102 crosses between sub-map areas, the current sub-map or sub-maps used by the localizers 132, 134 is updated, as described herein. For example, the vehicle position 156B is near a boundary between sub-map area 152I and sub-map area 152E. In some examples, a map selector 150 determines that a localizer 132, 134 has provided a pose estimate with a new sub-map. The map selector 150 sends the other localizer 134 (and any other localizers in the pose system 130) a sub-map change message instructing the other localizer 134 to change to the new sub-map. Also, in some examples, the map selector determines with a new position determined by the pose state estimator 138 from motion sensor data indicates that the vehicle has crossed a boundary of a sub-map area. In response, the map selector 150 sends a sub-map change message to all of the localizers 132, 134 in the pose system 130.

Figure 2:
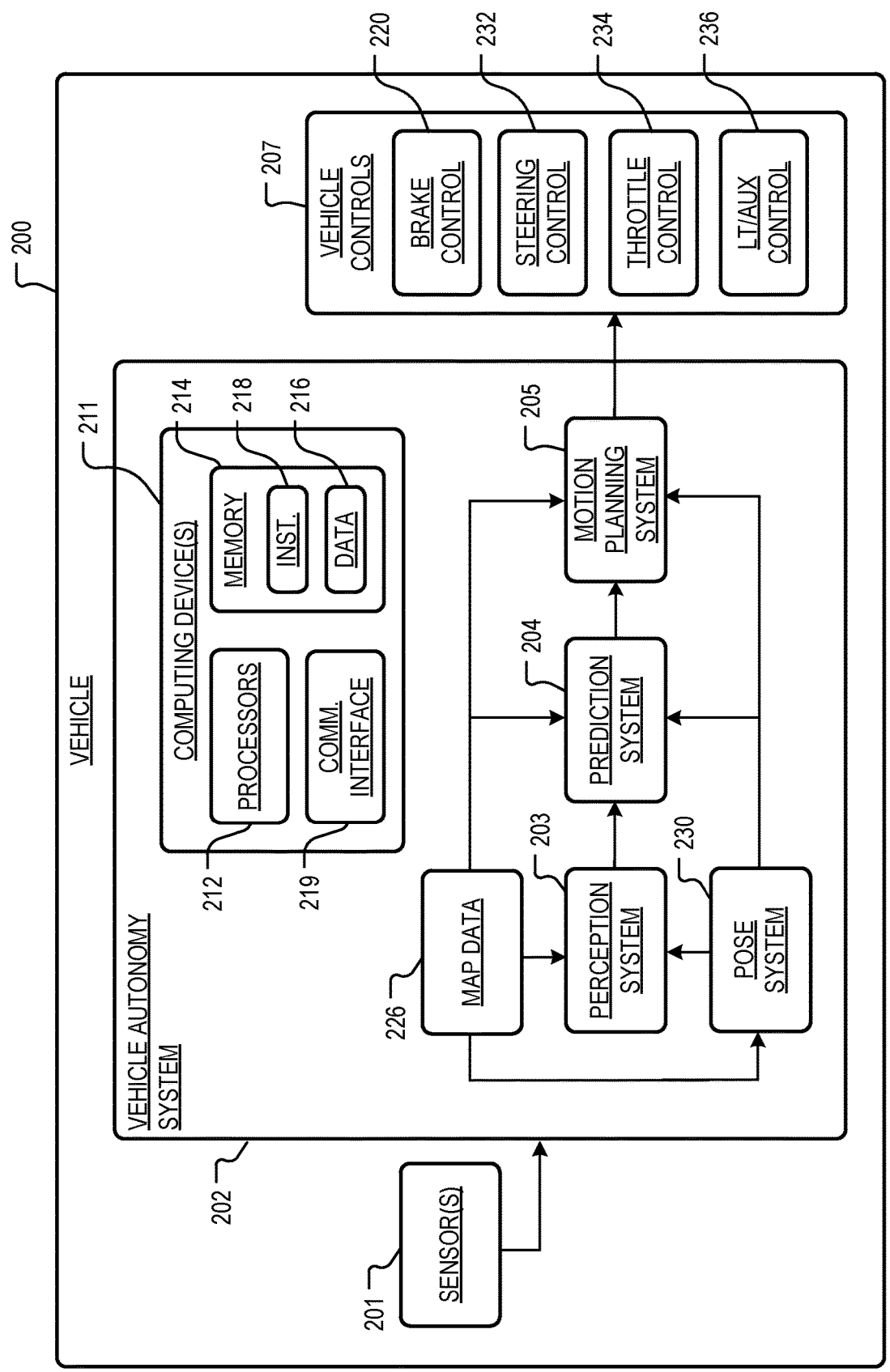
FIG. 2 is a block diagram showing one example of a vehicle according to example aspects of the present disclosure.

FIG. 2 is a block diagram showing one example of a vehicle 200 according to example aspects of the present disclosure. The vehicle 200 can be, for example, an autonomous or semi-autonomous vehicle. The vehicle 200 includes one or more sensors 201, a vehicle autonomy system 202, and one or more vehicle controls 207. The vehicle autonomy system 202 can be engaged to control the vehicle 200 or to assist in controlling the vehicle 200. The vehicle autonomy system 202, sometimes referred to as an Autonomous Vehicle (AV) stack, receives sensor data from the one or more sensors 201, attempts to comprehend the environment surrounding the vehicle 200 by performing various processing techniques on data collected by the sensors 201, and generates an appropriate motion path through the environment. The vehicle autonomy system 202 can control the one or more vehicle controls 207 to operate the vehicle 200 according to the motion path.

The vehicle autonomy system 202 includes a perception system 203, a prediction system 204, a motion planning system 205, and a pose system 230 that cooperate to perceive the surrounding environment of the vehicle 200 and determine a motion plan for controlling the motion of the vehicle 200 accordingly. The pose system 230 may be arranged to operate as described herein.

Various portions of the autonomous vehicle system 202 receive sensor data from the one or more sensors 201. For example, the sensors 201 may include remote detection sensors as well as motion sensors such as an inertial measurement unit (IMU), one or more encoders, one or more odometers, etc. The sensor data can include information that describes the location of objects within the surrounding environment of the vehicle 200, information that describes the motion of the vehicle, etc.

The sensors 201 may also include one or more remote detection sensors or sensor systems, such as a LIDAR, a RADAR, one or more cameras, etc. As one example, a LIDAR system of the one or more sensors 201 generates sensor data (e.g., remote sensor data) that includes the location (e.g., in three-dimensional space relative to the LIDAR system) of a number of points that correspond to objects that have reflected a ranging laser. For example, the LIDAR system can measure distances by measuring the Time of Flight (TOF) that it takes a short laser pulse to travel from the sensor to an object and back, calculating the distance from the known speed of light.

As another example, for a RADAR system of the one or more sensors 201 generates sensor data (e.g., remote sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, one or more cameras of the one or more sensors 201 may generate sensor data (e.g., remote sensor data) including still or moving images. Various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in image or images captured by the one or more cameras. Other sensor systems can identify the location of points that correspond to objects as well.

As another example, the one or more sensors 201 can include a positioning system. The positioning system can determine a current position of the vehicle 200. The positioning system can be any device or circuitry for analyzing the position of the vehicle 200. For example, the positioning system can determine a position by using one or more of inertial sensors, a GNSS system such as GPS, based on IP address, by using triangulation and/or proximity to network access points or other network components (e.g., cellular towers, WiFi access points, etc.) and/or other suitable techniques. The position of the vehicle 200 can be used by various systems of the vehicle autonomy system 202.

Thus, the one or more sensors 201 can be used to collect sensor data that includes information that describes the location (e.g., in three-dimensional space relative to the vehicle 20) of points that correspond to objects within the surrounding environment of the vehicle 200. In some implementations, the sensors 201 can be located at various different locations on the vehicle 200. As an example, in some implementations, one or more cameras and/or LIDAR sensors can be located in a pod or other structure that is mounted on a roof of the vehicle 200 while one or more RADAR sensors can be located in or behind the front and/or rear bumper(s) or body panel(s) of the vehicle 200. As another example, camera(s) can be located at the front or rear bumper(s) of the vehicle 200 as well. Other locations can be used as well.

The pose system 230 receives some or all of the sensor data from sensors 201 and generates vehicle poses for the vehicle 200. A vehicle pose describes the position and attitude of the vehicle. The position of the vehicle 200 is a point in a three dimensional space. In some examples, the position is described by values for a set of Cartesian coordinates, although any other suitable coordinate system may be used. The attitude of the vehicle 200 generally describes the way in which the vehicle 200 is oriented at its position. In some examples, attitude is described by a yaw about the vertical axis, a pitch about a first horizontal axis and a roll about a second horizontal axis. In some examples, the pose system 230 generates vehicle poses periodically (e.g., every second, every half second, etc.) The pose system appends time stamps to vehicle poses, where the time stamp for a pose indicates the point in time that is described by the pose. The pose system 230 generates vehicle poses by comparing sensor data to map data 226 describing the surrounding environment of the vehicle 200. The pose system 230, in some examples, is arranged similar to the pose system 130 of FIG. 1. For example, the pose system 130 may comprise one or more localizers and a pose state estimator, as described herein.

The perception system 203 detects objects in the surrounding environment of the vehicle 200 based on sensor data, map data 226 and/or vehicle poses provided by the pose system 230. Map data 226, for example, may provide detailed information about the surrounding environment of the vehicle 200. The map data 226 can provide information regarding: the identity and location of different roadways, segments of roadways, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the vehicle autonomy system 202 in comprehending and perceiving its surrounding environment and its relationship thereto. A roadway may be a place where the vehicle can drive and may include, for example, a road, a street, a highway, a lane, a parking lot, a driveway, etc. The perception system 203 may utilize vehicle poses provided by the pose system 230 to place the vehicle 200 within the map data and thereby predict which objects should be in the vehicle's surrounding environment.

In some examples, the perception system 203 determines state data for one or more of the objects in the surrounding environment of the vehicle 200. State data may describe a current state of an object (also referred to as features of the object). The state data for each object describes, for example, an estimate of the object's: current location (also referred to as position); current speed (also referred to as velocity); current acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the vehicle 200; minimum path to interaction with the vehicle 200; minimum time duration to interaction with the vehicle 200; and/or other state information.

In some implementations, the perception system 203 can determine state data for each object over a number of iterations. In particular, the perception system 203 can update the state data for each object at each iteration. Thus, the perception system 203 can detect and track objects, such as vehicles, that are proximate to the vehicle 200 over time.

The prediction system 204 is configured to predict one or more future positions for an object or objects in the environment surrounding the vehicle 200 (e.g., an object or objects detected by the perception system 203). The prediction system 204 can generate prediction data associated with one or more of the objects detected by the perception system 203. In some examples, the prediction system 204 generates prediction data describing each of the respective objects detected by the perspective system 204.

Prediction data for an object can be indicative of one or more predicted future locations of the object. For example, the prediction system 204 may predict where the object will be located within the next 5 seconds, 20 seconds, 200 seconds, etc. Prediction data for an object may indicate a predicted trajectory (e.g., predicted path) for the object within the surrounding environment of the vehicle 200. For example, the predicted trajectory (e.g., path) can indicate a path along which the respective object is predicted to travel over time (and/or the speed at which the object is predicted to travel along the predicted path). The prediction system 204 generates prediction data for an object, for example, based on state data generated by the perception system 203. In some examples, the prediction system 204 also considers one or more vehicle poses generated by the pose system 230 and/or map data 226.

In some examples, the prediction system 204 uses state data indicative of an object type or classification to predict a trajectory for the object. As an example, the prediction system 204 can use state data provided by the perception system 203 to determine that particular object (e.g., an object classified as a vehicle) approaching an intersection and maneuvering into a left-turn lane intends to turn left. In such a situation, the prediction system 204 can predict a trajectory (e.g., path) corresponding to a left-turn for the vehicle such that the vehicle turns left at the intersection. Similarly, the prediction system 204 can determine predicted trajectories for other objects, such as bicycles, pedestrians, parked vehicles, etc. The prediction system 204 can provide the predicted trajectories associated with the object(s) to the motion planning system 205.

In some implementations, the prediction system 204 is a goal-oriented prediction system 204 that generates one or more potential goals, selects one or more of the most likely potential goals, and develops one or more trajectories by which the object can achieve the one or more selected goals. For example, the prediction system 204 can include a scenario generation system that generates and/or scores the one or more goals for an object and a scenario development system that determines the one or more trajectories by which the object can achieve the goals. In some implementations, the prediction system 204 can include a machine-learned goal-scoring model, a machine-learned trajectory development model, and/or other machine-learned models.

The motion planning system 205 determines a motion plan for the vehicle 200 based at least in part on the predicted trajectories associated with the objects within the surrounding environment of the vehicle, the state data for the objects provided by the perception system 203, vehicle poses provided by the pose system 230, and/or map data 226. Stated differently, given information about the current locations of objects and/or predicted trajectories of objects within the surrounding environment of the vehicle 20, the motion planning system 205 can determine a motion plan for the vehicle 200 that best navigates the vehicle 200 relative to the objects at such locations and their predicted trajectories on acceptable roadways.

In some implementations, the motion planning system 205 can evaluate one or more cost functions and/or one or more reward functions for each of one or more candidate motion plans for the vehicle 200. For example, the cost function(s) can describe a cost (e.g., over time) of adhering to a particular candidate motion plan while the reward function(s) can describe a reward for adhering to the particular candidate motion plan. For example, the reward can be of opposite sign to the cost.

Thus, given information about the current locations and/or predicted future locations/trajectories of objects, the motion planning system 205 can determine a total cost (e.g., a sum of the cost(s) and/or reward(s) provided by the cost function(s) and/or reward function(s)) of adhering to a particular candidate pathway. The motion planning system 205 can select or determine a motion plan for the vehicle 200 based at least in part on the cost function(s) and the reward function(s). For example, the motion plan that minimizes the total cost can be selected or otherwise determined. The motion plan can be, for example, a path along which the vehicle 200 will travel in one or more forthcoming time periods. In some implementations, the motion planning system 205 can be configured to iteratively update the motion plan for the vehicle 200 as new sensor data is obtained from one or more sensors 201. For example, as new sensor data is obtained from one or more sensors 201, the sensor data can be analyzed by the perception system 203, the prediction system 204, and the motion planning system 205 to determine the motion plan.

Each of the perception system 203, the prediction system 204, the motion planning system 205, and the pose system, can be included in or otherwise a part of a vehicle autonomy system configured to determine a motion plan based at least in part on data obtained from one or more sensors 201. For example, data obtained by one or more sensors 201 can be analyzed by each of the perception system 203, the prediction system 204, and the motion planning system 205 in a consecutive fashion in order to develop the motion plan. While FIG. 2 depicts elements suitable for use in a vehicle autonomy system according to example aspects of the present disclosure, one of ordinary skill in the art will recognize that other vehicle autonomy systems can be configured to determine a motion plan for an autonomous vehicle based on sensor data.

The motion planning system 205 can provide the motion plan to one or more vehicle control systems 207 to execute the motion plan. For example, the one or more vehicle control systems 207 can include throttle systems, brake systems, steering systems, and other control systems, each of which can include various vehicle controls (e.g., actuators or other devices that control gas flow, steering, braking, etc.) to control the motion of the vehicle. The various control systems 207 can include one or more controllers, control devices, motors, and/or processors.

The vehicle control systems 207 can include a brake control module 220. The brake control module 220 is configured to receive a braking command from the vehicle autonomy system 202 (e.g., from the motion planning system 205), and in response, brake the vehicle 200. In some examples, the brake control module 220 includes a primary system and a secondary system. The primary system may receive braking commands and, in response, brake the vehicle 200. The secondary system may be configured to determine a failure of the primary system to brake the vehicle 200 in response to receiving the braking command.

A steering control system 232 is configured to receive a steering command from the vehicle autonomy system 202 (e.g., from the motion planning system 205) and, in response provide a steering input to steer the vehicle 200. A throttle control system 234 is configured to receive a throttle command from the vehicle autonomy system (e.g., from the motion planning system 205) and, in response provide a throttle input to control the engine or other propulsion system of the vehicle 200. A lighting/auxiliary control module 236 may receive a lighting or auxiliary command. In response, the lighting/auxiliary control module 236 may control a lighting and/or auxiliary system of the vehicle 200. Controlling a lighting system may include, for example, turning on, turning off, or otherwise modulating headlines, parking lights, running lights, etc. Controlling an auxiliary system may include, for example, modulating windshield wipers, a defroster, etc.

The vehicle autonomy system 202 includes one or more computing devices, such as the computing device 211, that may implement all or parts of the perception system 203, the prediction system 204, the motion planning system 205 and/or the pose system 230. The example computing device 211 can include one or more processors 212 and one or more memory devices (collectively referred to as memory) 214. The one or more processors 212 can be any suitable processing device (e.g., a processor core, a microprocessor, an Application Specific Integrated Circuit (ASIC), a Field Programmable Gate Array (FPGA), a microcontroller, etc.) and can be one processor or a plurality of processors that are operatively connected. The memory 214 can include one or more non-transitory computer-readable storage mediums, such as Random Access Memory (RAM), Read Only Memory (ROM), Electrically Erasable Programmable Read Only Memory (EEPROM), Erasable Programmable Read Only Memory (EPROM), flash memory devices, magnetic disks, etc., and combinations thereof. The memory 214 can store data 216 and instructions 218 which can be executed by the processor 212 to cause the vehicle autonomy system 202 to perform operations. The one or more computing devices 211 can also include a communication interface 219, which can allow the one or more computing devices 211 to communicate with other components of the vehicle 200 or external computing systems, such as via one or more wired or wireless networks. Additional descriptions of hardware and software configurations for computing devices, such as the computing device(s) 211 are provided herein at FIGS. 8 and 9.

Figure 3:
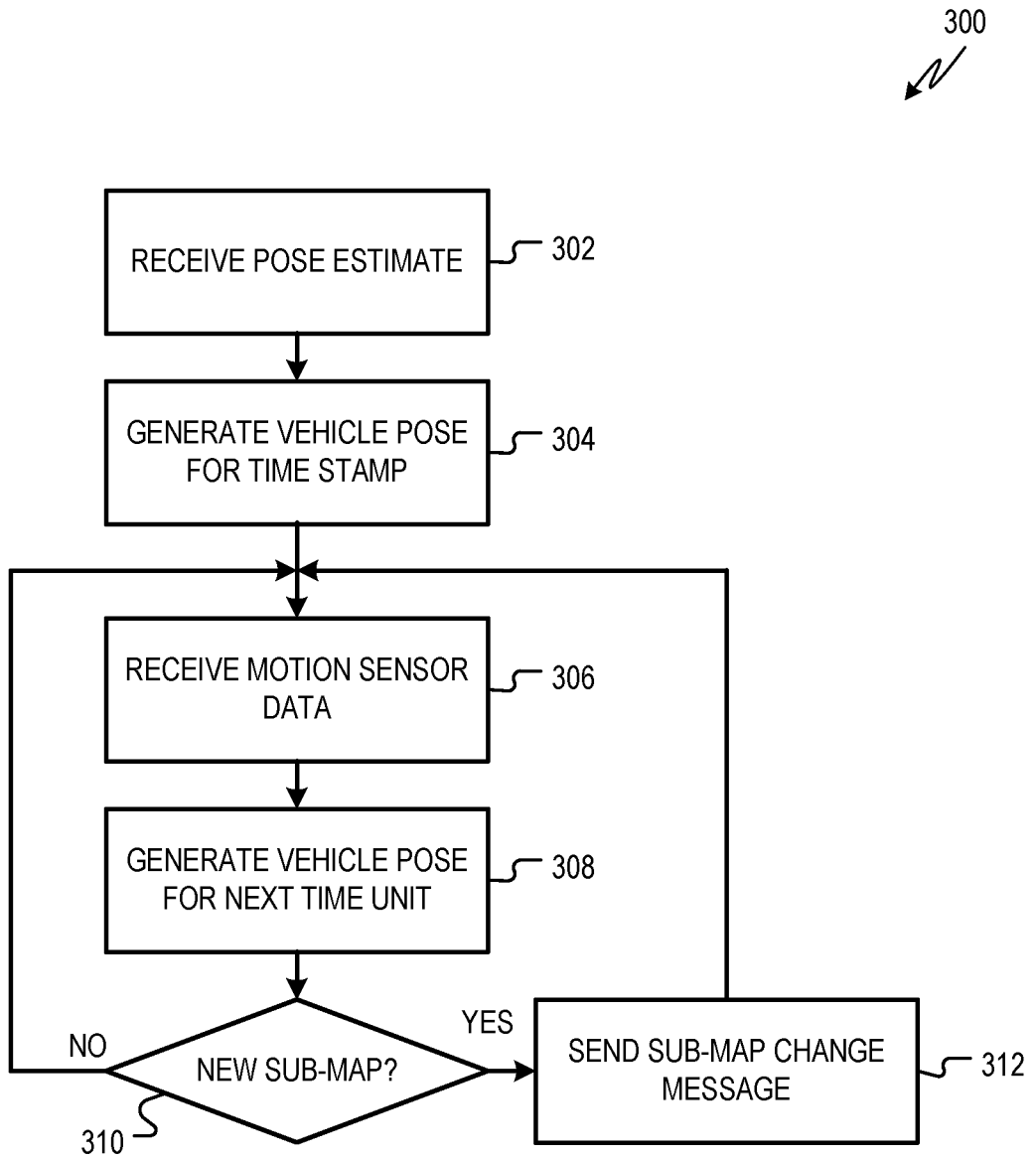
FIG. 3 is a flowchart showing one example of a process flow that may be executed by a pose state estimator and/or a map selector thereof to detect a sub-map change.

FIG. 3 is a flowchart showing one example of a process flow 300 that may be executed by a pose state estimator and/or a map selector thereof to detect a sub-map change. As described herein, the pose state estimator generates vehicle poses more frequently that the localizers generate pose estimates. Accordingly, the pose state estimator generates vehicle poses for some time stamps that are not described by a specific pose estimate. The pose state estimator uses motion sensor data to extrapolate forward from a previous vehicle pose to find a next vehicle pose for a next time stamp. If the next vehicle pose has a position in a different sub-map area, then the pose state estimator changes the sub-map for the pose system.

At operation 302, the pose state estimator receives a pose estimate describing a first time stamp. The pose estimate is received from one of the localizers of the pose system. At operation 304, the pose state estimator receives motion sensor data describing motion of the vehicle. For example, the motion sensor data may be received from an IMU, from one or more encoders, from one or more odometers, etc. The motion sensor data may describe the motion of the vehicle after the first time stamp. For example, the motion sensor data may describe the motion of the vehicle at a second time stamp that is after the first time stamp.

At operation 304, the pose state estimator determines a vehicle pose for the first time stamp based at least in part on the pose estimate received at operation 302. In some examples, the pose state estimator executes a Kalman filter. The Kalman filter takes as input one or more vehicle poses for previous time stamps. In some examples, the Kalman filter also takes as input previous pose estimates from the various localizers. The vehicle poses and/or pose estimates may be described by covariance indicators that describe the uncertainty or error associated with the pose estimates and/or vehicle poses. A covariance indicator may describe a vehicle pose or pose estimate in general or, in some examples, include distinct covariances for different dimensions (e.g., x, y, z, yaw, pitch, roll, etc.). The Kalman filter may also take as input motion sensor data that has been captured since the previous time stamp. As output, the Kalman filter provides the vehicle pose for the first time stamp and, optionally, a covariance indicator for the next vehicle pose.

At operation 306, the pose state estimator receives motion sensor data, for example, from an IMU, encoder, odometer, etc. The motion data describes the vehicle at or about a next time stamp that is after the first time stamp. The next time stamp may be immediately after the first time stamp. At operation 308, the pose state estimator generates a vehicle pose for the next time stamp. The vehicle pose may be generated, for example, based on one or more previous vehicle poses, one or more previous pose estimates, and/or the motion sensor data received at operation 306.

At operation 310, the pose state estimator determines if the next vehicle pose determined at operation 308 has a position that is in a new sub-map area. If the next vehicle pose is in a new sub-map area, then pose state estimator sends a sub-map change message to the various localizers at operation 312. The sub-map change message may be sent to each localizer in the pose system. The sub-map change message indicates that the current sub-map has changed and includes an indication of the new sub-map. Upon sending the sub-map change message (or if the next vehicle pose is not positioned in a new submap), the pose state estimator returns to operations 306 and 308 to determine another vehicle pose.

The process flow 300 may continue until a next pose estimate is received from one of the localizers. When a next pose estimate is received from one of the localizers, the pose state estimator may proceed as from operation 302 described herein.

Figure 4:
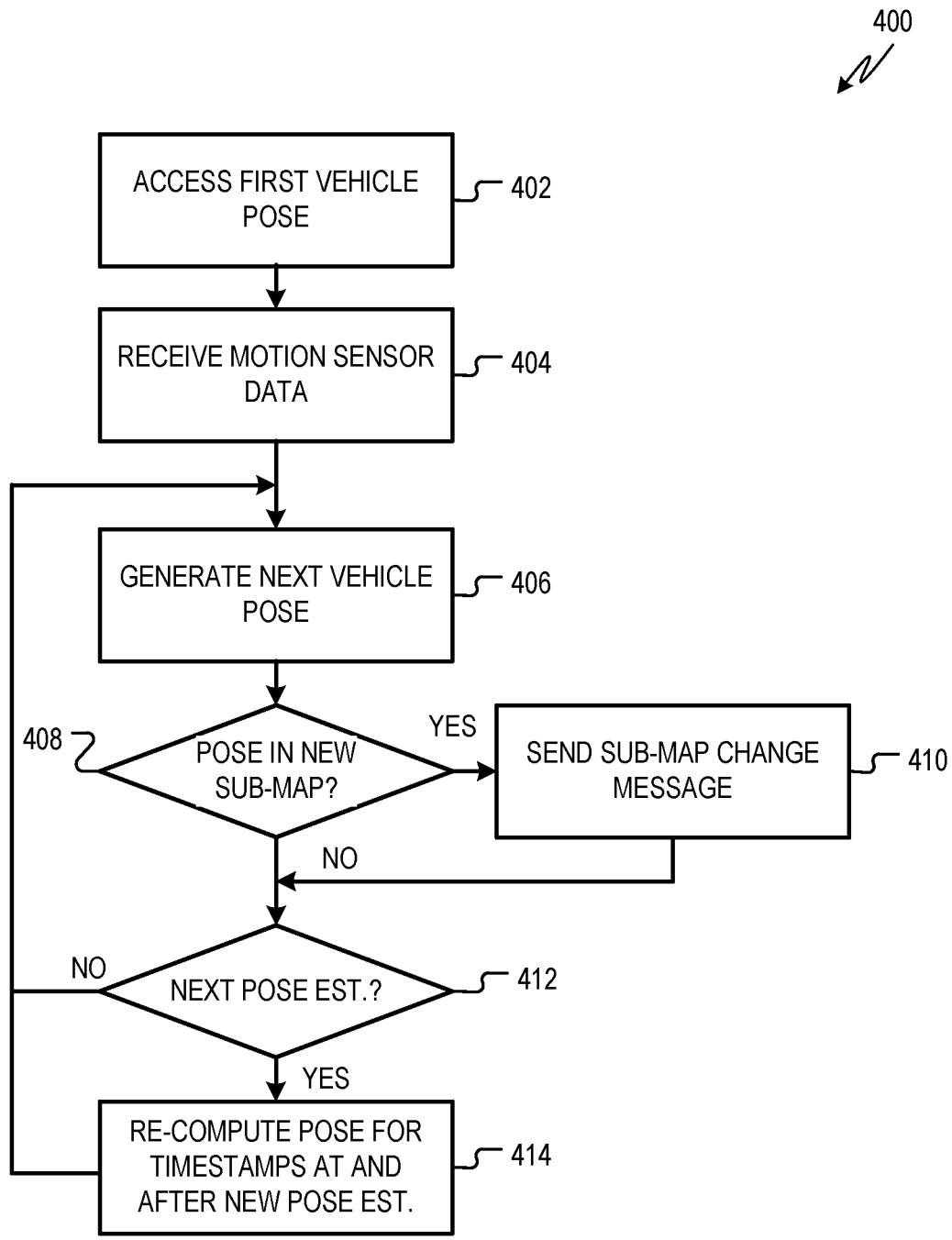
FIG. 4 is a flowchart showing one example of a process flow that may be executed by a pose state estimator and/or a map selector thereof to detect a sub-map change indicated by a localizer and propagate the sub-map change to other localizers in the pose system.

FIG. 4 is a flowchart showing one example of a process flow 400 that may be executed by a pose state estimator and/or a map selector thereof to detect a sub-map change indicated by a localizer and propagate the sub-map change to other localizers in the pose system. For example, the process flow 400 shows one example way in which the pose state estimator can determine the current sub-map for the vehicle while waiting on localizers to provide pose estimates.

At operation 402, the pose state estimator accesses a first vehicle pose. The first vehicle pose may have been generated, for example, by the pose state estimator to describe a first time stamp. In some examples, the first vehicle pose is based on one or more localizer-generated pose estimates describing the first time stamp. Accessing the first vehicle pose may include, for example, retrieving the first vehicle pose from a memory associated with the pose state estimator and/or from another component of the pose system and/or the vehicle autonomy system. At operation 404, the pose state estimator receives motion sensor data, for example, from an IMU, encoder, odometer, or other suitable sensor.

At operation 406, the pose state estimator determines a vehicle pose for the next time stamp. The next time stamp is after the first time stamp and, in some examples, is immediately after the first time stamp. Generating the vehicle pose for the next time stamp may include extrapolating the first vehicle pose in view of a trajectory of the vehicle indicated by the first vehicle pose and other vehicle poses and/or in view of the speed and direction of the vehicle indicated by the motion sensor data. The vehicle pose may be provided to the vehicle autonomy system for use as described herein.

At operation 408, the pose state estimator determines if the position of the vehicle indicated by the next vehicle pose determined at operation 406 is in a new sub-map. The next vehicle pose is in a new sub-map, for example, if the position of the vehicle pose is in a different sub-map area than the position of the first vehicle pose accessed at operation 402. If the next vehicle pose is in a new sub-map, then the pose state estimator updates the current sub-map at operation 410. This may include sending a sub-map change message to the localizers. The sub-map change message includes an indication that the sub-map change has occurred and an indication of the new sub-map. After receiving the sub-map change message, the various localizers begin to generate pose estimates by matching remote sensor data to the new sub-map.

If the next vehicle pose is not in a new sub-map and/or after updating the current sub-map, the pose state estimator determines, at operation 412, whether a new pose estimate has been received from one or more of the localizers. If a new pose estimate has been received, the pose state estimator, at operation 414, recomputes one or more vehicle poses for the timestamp of the pose estimate and for any timestamps after the pose estimate for which the pose state estimator has already generated a vehicle pose. Recomputed vehicle poses may be provided to vehicle autonomy system for use as described herein.

If no new pose estimate is received at operation 412 and/or after recomputing vehicle poses at operation 414, the pose state estimator returns to operation 406 and generates a vehicle pose for the next time stamp (e.g., the timestamp after the timestamp described by the most recent vehicle pose generated at operation 406.

Figure 5:
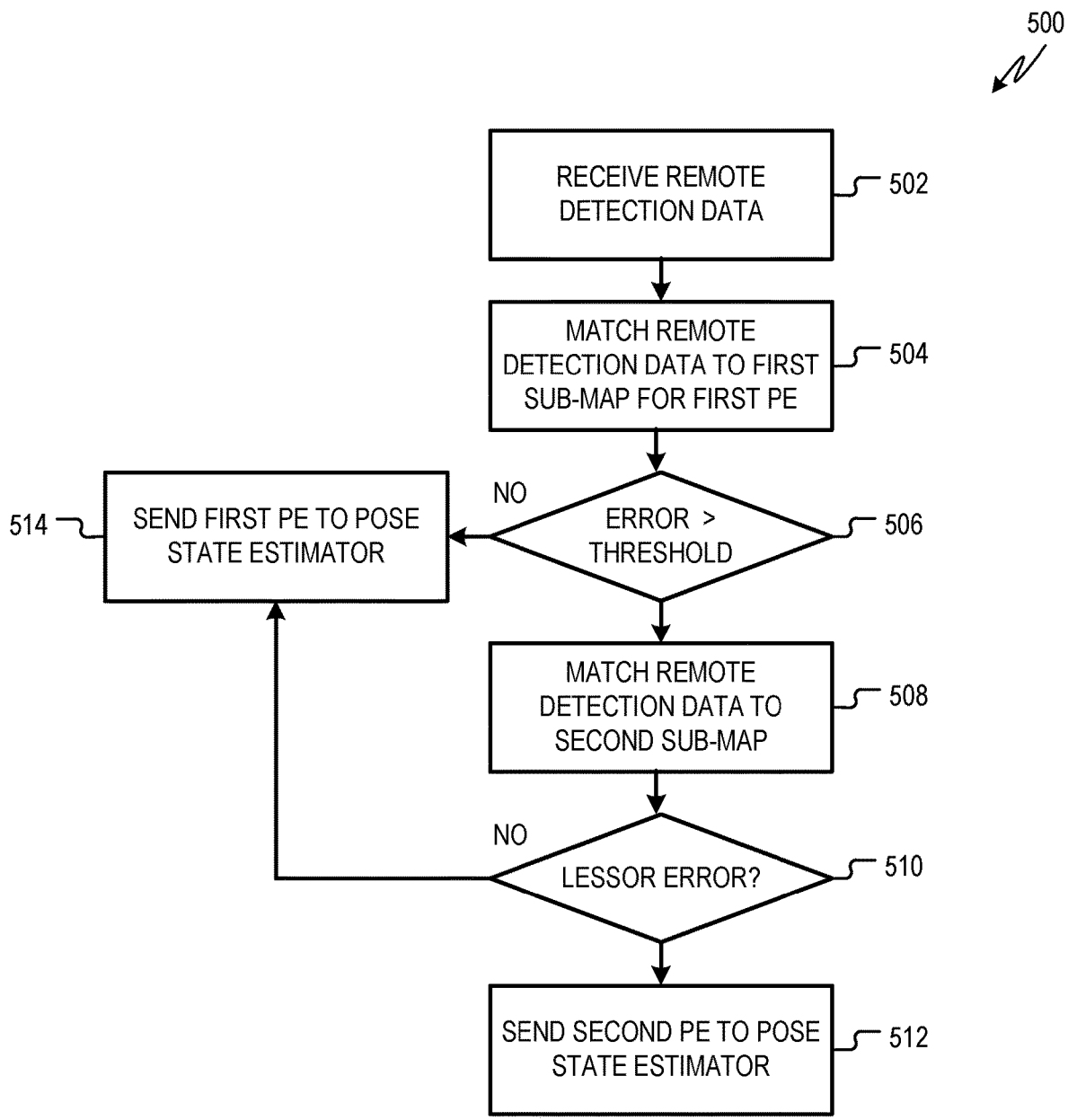
FIG. 5 is a flowchart showing one example of a process flow that may be executed by a localizer to determine a pose estimate in a different sub-map.

FIG. 5 is a flowchart showing one example of a process flow 500 that may be executed by a localizer to determine a pose estimate in a different sub-map. The process flow 500 may be executed by all, or less than all, of the localizers in a pose system. In some examples, the localizer begins the process flow 500 with an indication of a current sub-map. The localizer may have selected the current sub-map and/or may have received an indication of the current sub-map from the pose state estimator (e.g., as part of a sub-map change message).

At operation 502, the localizer receives remote detection data that describes the environment surrounding the vehicle. For example, the remote detection data may describe objects in the environment, ground intensity in the environment, etc. The remote detection data may describe a first time stamp. For example, the remote detection data may have been captured at the first timestamp. At operation 504, the localizer matches the remote detection data to the current sub-map to generate a first candidate pose estimate for the first time stamp. Generating the first candidate pose estimate may include finding a position and an attitude for the vehicle that best match the remote detection data to the current sub-map.

At operation 506, the localizer determines if an error of the first candidate pose estimate is greater than an error threshold. The error of the first candidate pose estimate may be described by a covariance indicator for the first candidate pose estimate. As described herein, the covariance indicator describes errors in multiple dimensions. In some examples, the error of the first pose estimate exceeds the error threshold if the error in any given dimension is greater than the threshold. In some examples, the error of the first pose estimate exceeds the error threshold if an aggregate error is greater than the error threshold.

If the error for the pose estimate is not greater than the error threshold, the localizer sends the first candidate pose estimate to the pose state estimator at operation 514. If the error is greater than the error threshold, the localizer generates a second candidate pose estimate at operation 508 by matching the remote detection data to a second sub-map. The second sub-map may be selected in any suitable manner. For example, if the position of the first pose estimate is near a boundary between a first sub-map area and a second sub-map area, the second sub-map may be the sub-map for the second sub-map area. Also, in some examples, the localizer may review previous vehicle poses and/or its own previous pose estimates to determine a trajectory of the vehicle. The second sub-map may correspond to a sub-map area pointed to by the vehicle's trajectory.

At operation 510, the localizer determines if the error of the second candidate pose estimate is less than the error of the first pose estimate. If not, the localizer sends the first candidate pose estimate to the pose state estimator at operation 514. If the error of the second candidate pose estimate is less than the error of the first pose estimate, then the localizer sends the second pose estimate to the pose state estimator at operation 512 along with an indication of the second sub-map. In response, the pose state estimator may send a sub-map change message to the other localizers in the pose system indicating that the current sub-map is now the second sub-map.

In the example of FIG. 5, the localizer evaluates a second sub-map when the error of the first pose estimate exceeds the error threshold. In some examples, the localizer could evaluate more than two sub-maps. For example, the position of the vehicle may be close to more than two sub-map areas. Also, for example, the vehicle's trajectory or potential trajectories could point to more than one potential next sub-map area. In these cases, the localizer may evaluate additional sub-maps beyond just the second sub-map shown in FIG. 5. The resulting pose estimate with the lowest error may be provided to the pose state estimator.

Figure 6:
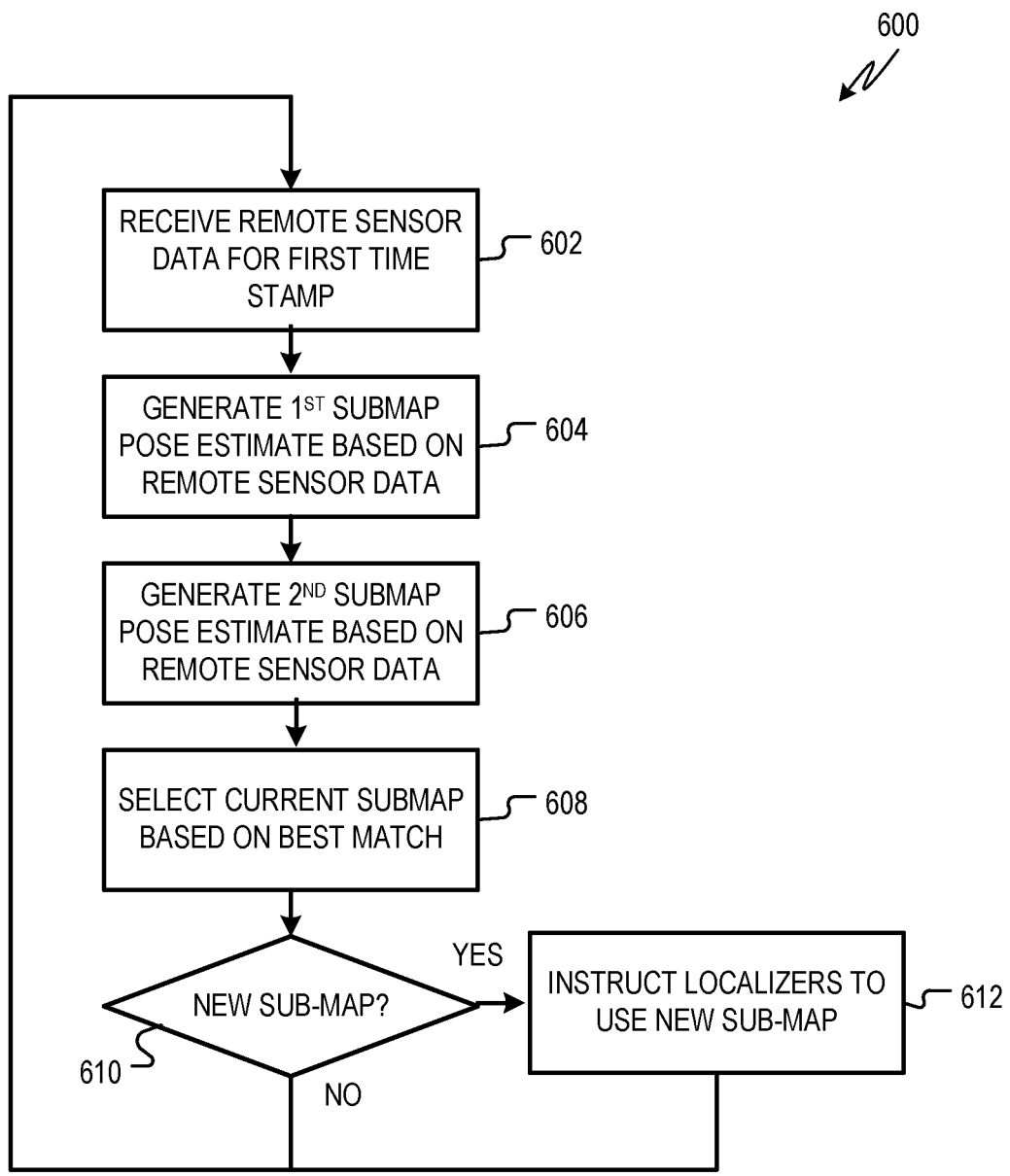
FIG. 6 is a flowchart showing an example process flow that may be executed by a localizer and/or a pose state estimator to select a current sub-map for the vehicle.

FIG. 6 is a flowchart showing an example process flow 600 that may be executed by a localizer and/or a pose state estimator to select a current sub-map for the vehicle. For example, the process flow 600 may be executed by some or all of the localizers of the pose system. In some examples, the process flow 600 is executed every time that the localizer generates a pose estimate. Also, in some examples, the process flow 600 is not executed every time that the localizer generates a pose estimate. For example, the process flow 600 may be executed when a previous vehicle pose and/or pose estimate is near a boundary between one sub-map and another sub-map.

At operation 602, the localizer receives remote sensor data for a first time stamp. At operation 604, the localizer generates a first sub-map pose estimate for the first time stamp by matching the received remote sensor data to a first sub-map. In some examples, the first sub-map is a current sub-map indicated to the localizer, for example, by the pose state estimator, as described herein. At operation 606, the localizer generates a second sub-map pose estimate for the first time stamp by matching the received remote sensor data to a second sub-map. The second sub-map may be any suitable sub-map. For example, if a previous vehicle pose generated by the pose state estimator and/or pose estimate generated by the localizer was close to a sub-map area boundary, the second sub-map may be the sub-map that describes an adjacent sub-map area. In the example of FIG. 6, the localizer generates pose estimates for two sub-maps at operations 604 and 606. In some examples, the localizer generates pose estimates for additional sub-maps as well.

At operation 608, the localizer selects a current sub-map based on the first sub-map pose estimate and the second sub-map pose estimate. For example, the current sub-map may be the sub-map used by the more sub-map pose estimate with the lowest error. The error of a pose estimate may be determined, for example, by considering the respective covariance indicators for the sub-map pose estimates.

At operation 610, the localizer determines if the current sub-map selected at operation 608 is a different than the previously current sub-map. If the current sub-map is new, then the localizer instructs other localizers of the pose system to use the new current sub-map. The localizer may directly send sub-map change messages to other localizers. In some examples, the localizer informs the pose state estimator and/or map selector of the new current sub-map. The pose state estimator and/or map selector then sends sub-map change messages to the various localizers. In some examples, the localizer executes the process flow 600 continuously. For example, if the current submap is not new, or after operation 612, the localizer returns to operation 602 and receives remote sensor data for a next time stamp.

Figure 7:
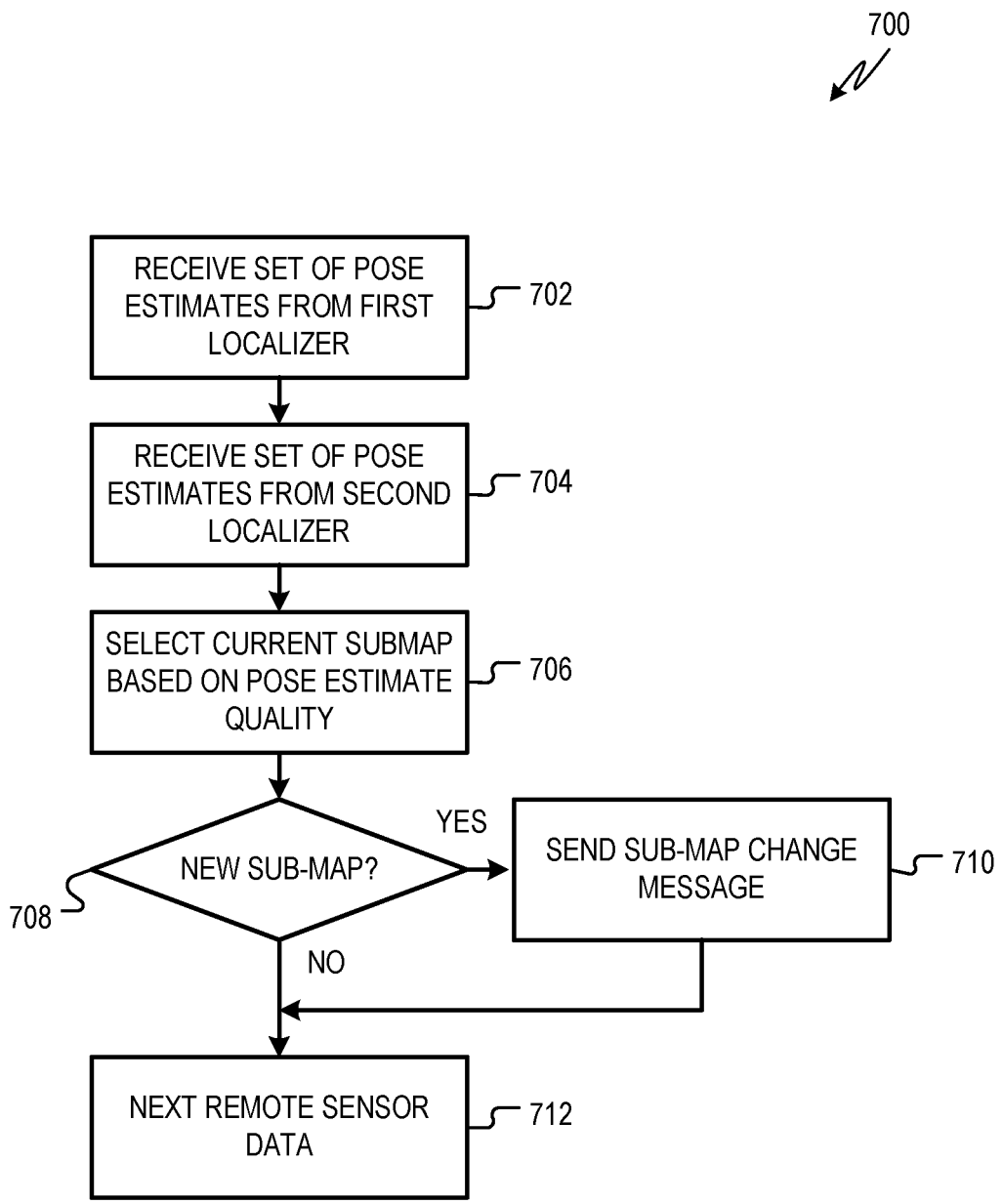
FIG. 7 is a flowchart showing an example process flow that may be executed by a pose state estimator to select a current sub-map for the vehicle based on pose estimates received from multiple pose state estimators.

In some examples, localizers generate pose estimates in different sub-maps and send those pose estimates to the pose state estimator. The pose state estimator selects a current sub-map, for example, based on the pose estimates received from different localizers. FIG. 7 is a flowchart showing an example process flow 700 that may be executed by a pose state estimator to select a current sub-map for the vehicle based on pose estimates received from multiple pose state estimators.

At operation 702, the pose state estimator receives a first set of pose estimates from a first localizer. The first set of pose estimates includes multiple pose estimates that describe the same time stamp, albeit on different sub-maps. For example a position of a first pose estimate for the first time stamp is on a first sub-map and a position of a second pose estimate for the first time stamp is on a second sub-map. In some examples, the first localizer generates the set of pose estimates by matching remote sensor data describing the first time stamp to multiple sub-maps. A pose estimate on the first sub-map is a best-fit match between the first time stamp remote sensor data and the first sub-map. A pose estimate on the second sub-map is a best-fit match between the first time stamp remote sensor data and the second sub-map, and so on.

At operation 704, the pose state estimator receives a second set of pose estimates from a second localizer. Pose estimates from the second set of pose estimates describe a second time stamp, again on different sub-maps. For example, a first pose estimate from the second localizer is on the first sub-map. A second pose estimate from the second localizer is on the second sub-map, and so on. The second time stamp described by the pose estimates from the second localizer may be the same time stamp as that described by the pose estimates from the first localizer or a different time stamp. The first and second sets of pose may describe the same set of sub-maps, or some overlapping sub-maps. For example, both sets may include pose estimates describing a first sub-map. Both sets may include pose estimates describing a second sub-map, and so on.

At operation 706, the pose state estimator selects the current sub-map based on the quality of the pose estimates received at operations 702 and 704. In some examples, pose estimates provided at operations 702 and 704 are accompanied by covariance indicators. The covariance indicators may be covariance matrices, traces or other mathematical summaries of covariance matrices, etc. In some examples, the pose state estimator receives covariance matrices from the localizers and generates traces or other mathematical summaries of the covariance matrices. The covariance indicators indicate the confidence in the pose estimates. The pose state estimator determines which sub-maps are associated with pose estimates having the highest confidence, as indicated by the various covariance indicators.

In other examples, the localizers provide pose estimates with other quality metrics. Some example quality metric describe a number or percent of remote sensing data points received by the localizer were successfully matches to corresponding points of the map data.

At operation 708, the pose state estimator determines if the current sub-map determined at operation 708 is new (e.g., different than a previously current sub-map). If yes, the pose state estimator sends a sub-map change message to the localizers of the pose system at operation 710. If the current sub-map is not new, or after sending the sub-map change message, the pose system, including the pose state estimator and the various localizers, moves to the next set of remote sensor data at operation 712. After receiving the next set of remote sensor data, the pose system may again execute the process flow 700. In some examples, the process flow 700 is executed periodically or upon the occurrence of certain conditions. For example, it may be computationally costly to have each localizer generate multiple pose estimates. Accordingly, in some examples, the process flow 700 is executed periodically (e.g., once every ten pose estimates, once every one hundred pose estimates, etc.). In some examples, the process flow 700 is executed when the vehicle's position is close to a sub-map area boundary. For example, if the position of a vehicle pose determined by the pose state estimator is within a threshold distance of a sub-map area boundary, the pose system may execute the process flow 700. When the process flow 700 is not executed, the localizers may determine one pose estimate each using the current sub-map.

Figure 8:
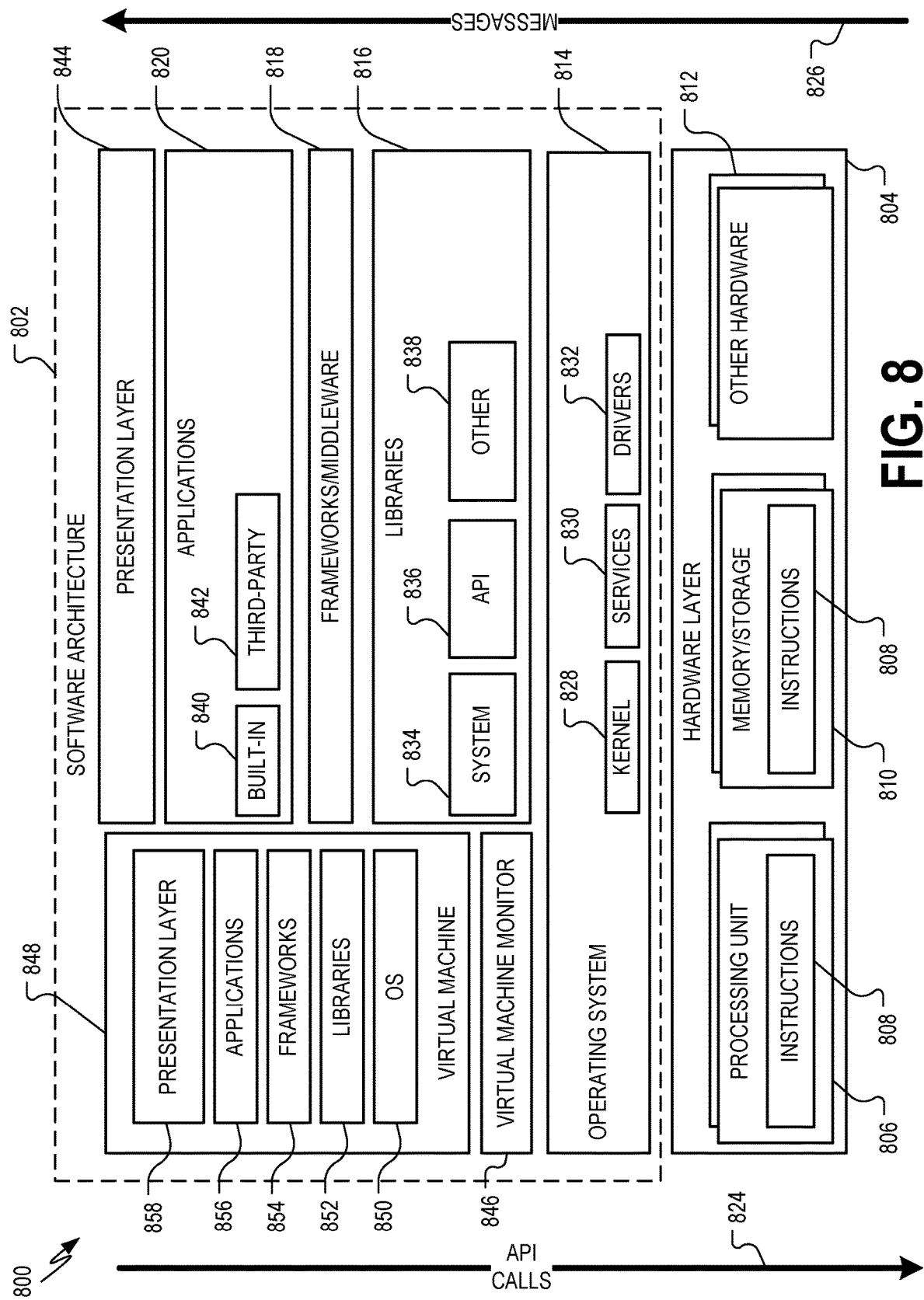
FIG. 8 is a block diagram showing one example of a software architecture for a computing device.

FIG. 8 is a block diagram 800 showing one example of a software architecture 802 for a computing device. The software architecture 802 may be used in conjunction with various hardware architectures, for example, as described herein. FIG. 8 is merely a non-limiting example of a software architecture 802 and many other architectures may be implemented to facilitate the functionality described herein. A representative hardware layer 804 is illustrated and can represent, for example, any of the above-referenced computing devices. In some examples, the hardware layer 804 may be implemented according to an architecture 900 of FIG. 9.

The representative hardware layer 804 comprises one or more processing units 806 having associated executable instructions 808. The executable instructions 808 represent the executable instructions of the software architecture 802, including implementation of the methods, modules, components, and so forth of FIGS. 1-5. The hardware layer 804 also includes memory and/or storage modules 810, which also have the executable instructions 808. The hardware layer 804 may also comprise other hardware 812, which represents any other hardware of the hardware layer 804, such as the other hardware illustrated as part of the architecture 900.

In the example architecture of FIG. 8, the software architecture 802 may be conceptualized as a stack of layers where each layer provides particular functionality. For example, the software architecture 802 may include layers such as an operating system 814, libraries 816, frameworks/middleware 818, applications 820, and a presentation layer 844. Operationally, the applications 820 and/or other components within the layers may invoke API calls 824 through the software stack and receive a response, returned values, and so forth illustrated as messages 826 in response to the API calls 824. The layers illustrated are representative in nature and not all software architectures have all layers. For example, some mobile or special-purpose operating systems may not provide a frameworks/middleware 818 layer, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. In some examples, the services 830 include an interrupt service. The interrupt service may detect the receipt of a hardware or software interrupt and, in response, cause the software architecture 802 to pause its current processing and execute an interrupt service routine (ISR) when an interrupt is received. The ISR may generate an alert.

The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than by interfacing directly with the underlying operating system 814 functionality (e.g., kernel 828, services 830, and/or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks 818 (also sometimes referred to as middleware) may provide a higher-level common infrastructure that may be utilized by the applications 820 and/or other software components/modules. For example, the frameworks 818 may provide various graphical user interface (GUI) functions, high-level resource management, high-level location services, and so forth. The frameworks 818 may provide a broad spectrum of other APIs that may be utilized by the applications 820 and/or other software components/modules, some of which may be specific to a particular operating system or platform.

The applications 820 include built-in applications 840 and/or third-party applications 842. Examples of representative built-in applications 840 may include, but are not limited to, a contacts application, a browser application, a book reader application, a location application, a media application, a messaging application, and/or a game application. The third-party applications 842 may include any of the built-in applications 840 as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™, Android™ Windows® Phone, or other computing device operating systems. In this example, the third-party application 842 may invoke the API calls 824 provided by the mobile operating system such as the operating system 814 to facilitate functionality described herein.

The applications 820 may utilize built-in operating system functions (e.g., kernel 828, services 830, and/or drivers 832), libraries (e.g., system libraries 834, API libraries 836, and other libraries 838), or frameworks/middleware 818 to create user interfaces to interact with users of the system. Alternatively, or additionally, in some systems, interactions with a user may occur through a presentation layer, such as the presentation layer 844. In these systems, the application/module "logic" can be separated from the aspects of the application/module that interact with a user.

Some software architectures utilize virtual machines. For example, systems described herein may be executed utilizing one or more virtual machines executed at one or more server computing machines. In the example of FIG. 8, this is illustrated by a virtual machine 848. A virtual machine creates a software environment where applications/modules can execute as if they were executing on a hardware computing device. The virtual machine 848 is hosted by a host operating system (e.g., the operating system 814) and typically, although not always, has a virtual machine monitor 846, which manages the operation of the virtual machine 848 as well as the interface with the host operating system (e.g., the operating system 814). A software architecture executes within the virtual machine 848, such as an operating system 850, libraries 852, frameworks/middleware 854, applications 856, and/or a presentation layer 858. These layers of software architecture executing within the virtual machine 848 can be the same as corresponding layers previously described or may be different.

Figure 9:
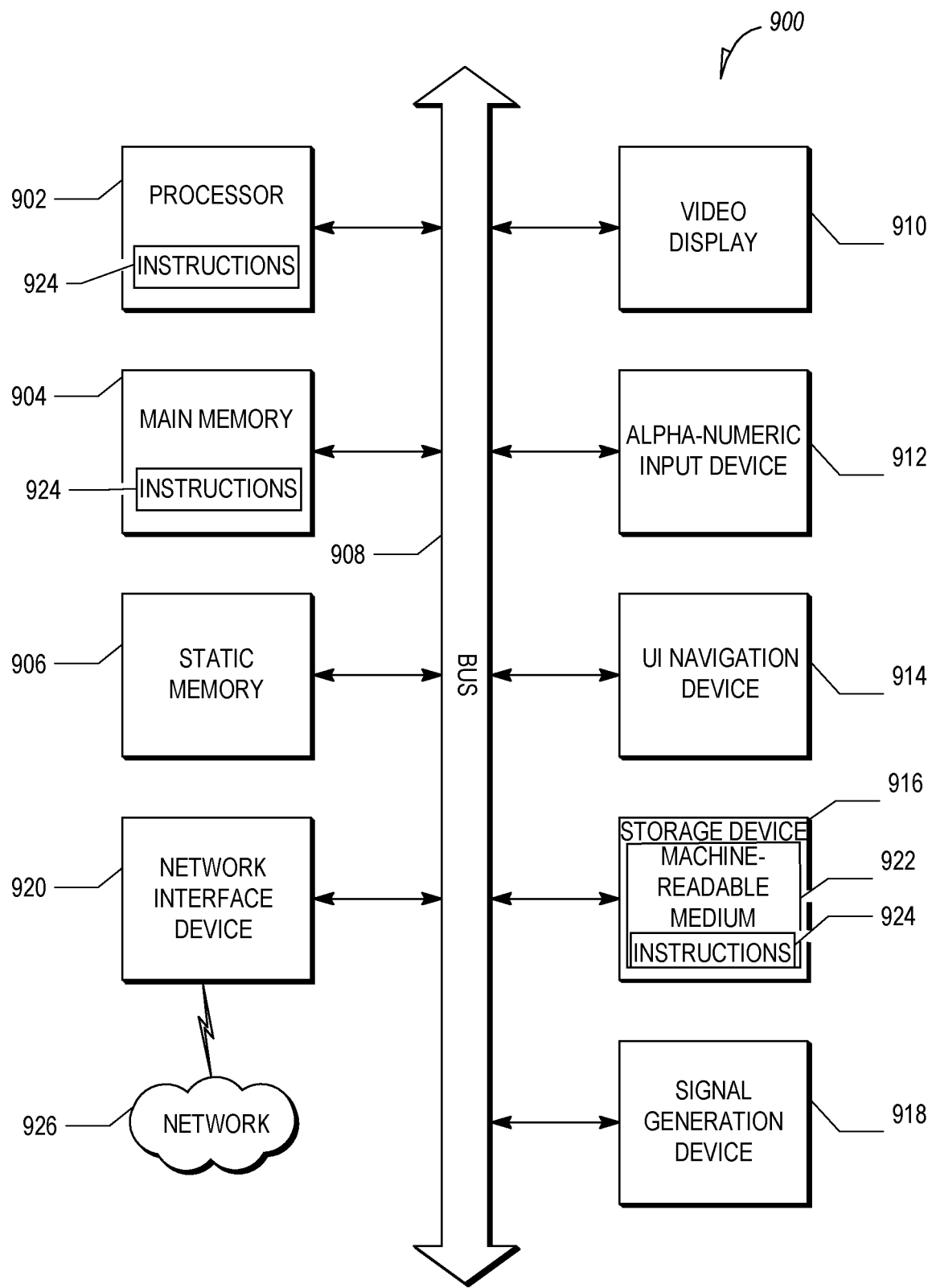
FIG. 9 is a block diagram illustrating a computing device hardware architecture, within which a set or sequence of instructions can be executed to cause a machine to perform examples of any one of the methodologies discussed herein.

FIG. 9 is a block diagram illustrating a computing device hardware architecture 900, within which a set or sequence of instructions can be executed to cause a machine to perform examples of any one of the methodologies discussed herein. The architecture 900 may describe, a computing device for executing the vehicle autonomy system, localizer(s), and/or pose state estimator described herein.

The architecture 900 may operate as a standalone device or may be connected (e.g., networked) to other machines. In a networked deployment, the architecture 900 may operate in the capacity of either a server or a client machine in server-client network environments, or it may act as a peer machine in peer-to-peer (or distributed) network environments. The architecture 900 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 900 includes a processor unit 902 comprising at least one processor (e.g., a central processing unit (CPU), a graphics processing unit (GPU), or both, processor cores, compute nodes, etc.). The architecture 900 may further comprise a main memory 904 and a static memory 906, which communicate with each other via a link 908 (e.g., bus). The architecture 900 can further include a video display unit 910, an input device 912 (e.g., a keyboard), and a UI navigation device 914 (e.g., a mouse). In some examples, the video display unit 910, input device 912, and UI navigation device 914 are incorporated into a touchscreen display. The architecture 900 may additionally include a storage device 916 (e.g., a drive unit), a signal generation device 918 (e.g., a speaker), a network interface device 920, and one or more sensors (not shown), such as a GNSS sensor, compass, accelerometer, or other sensor.

In some examples, the processor unit 902 or another suitable hardware component may support a hardware interrupt. In response to a hardware interrupt, the processor unit 902 may pause its processing and execute an ISR, for example, as described herein.

The storage device 916 includes a machine-readable medium 922 on which is stored one or more sets of data structures and instructions 924 (e.g., software) embodying or utilized by any one or more of the methodologies or functions described herein. The instructions 924 can also reside, completely or at least partially, within the main memory 904, within the static memory 906, and/or within the processor unit 902 during execution thereof by the architecture 900, with the main memory 904, the static memory 906, and the processor unit 902 also constituting machine-readable media.

Executable Instructions and Machine-Storage Medium

The various memories (i.e., 904, 906, and/or memory of the processor unit(s) 902) and/or storage device 916 may store one or more sets of instructions and data structures (e.g., instructions) 924 embodying or utilized by any one or more of the methodologies or functions described herein.

These instructions, when executed by processor unit(s) 902 cause various operations to implement the disclosed examples.

As used herein, the terms "machine-storage medium," "device-storage medium," "computer-storage medium" (referred to collectively as "machine-storage medium 922") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 922 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 922 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 924 can further be transmitted or received over a communications network 926 using a transmission medium via the network interface device 920 utilizing any one of a number of well-known transfer protocols (e.g., HTTP). Examples of communication networks include a LAN, a WAN, the Internet, mobile telephone networks, plain old telephone service (POTS) networks, and wireless data networks (e.g., Wi-Fi, 3G, and 5G LTE/LTE-A or WiMAX networks). The term "transmission medium" shall be taken to include any intangible medium that is capable of storing, encoding, or carrying instructions for execution by the machine, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

The invention claimed is:

1. A system for locating a vehicle, comprising:
a vehicle computing system comprising a processor and a data storage, wherein the vehicle computing system is programmed to execute operations comprising:
accessing a first position for the vehicle at a first time, wherein the first position is in a first map area of a plurality of map areas, and wherein the first position is based at least in part on a first position estimate generated by a first vehicle position generator executing at the vehicle computing system;
accessing a second position for the vehicle at a second time after the first time, wherein the second position is based at least in part on the first position of the vehicle and at least in part on sensor data describing a motion of the vehicle after the first time;
determining that the second position of the vehicle is in a second map area of the plurality of map areas; and
sending a first map change message to the first vehicle position generator, the first map change message indicating the second map area.

2. The system of claim 1, the operations further comprising:
receiving, by the first vehicle position generator, first remote sensor data describing an environment of the vehicle;
receiving, by the first vehicle position generator, the first map change message; and
matching, by the first vehicle position generator, the first remote sensor data to first map data describing the second map area to generate a second position estimate.

3. The system of claim 2, the operations further comprising sending a second map change message to a second vehicle position generator executing at the vehicle computing system, the second map change message also indicating the second map area.

4. The system of claim 3, the operations further comprising:
receiving, by the second vehicle position generator, second remote sensor data describing the environment of the vehicle;
receiving, by the second vehicle position generator, the first map change message; and
matching, by the second vehicle position generator, the second remote sensor data to second map data describing the second map area to generate a second position estimate, the second map data describing the second map area being different than the first map data describing the second map area.

5. The system of claim 1, wherein the sensor data comprises at least one of comprises global positioning system (GPS) data describing the vehicle, or motion sensor data describing motion of the vehicle.

6. The system of claim 1, the operations further comprising:
receiving from the first vehicle position generator, a second position estimate associated with the second time, wherein the second position estimate is in the second map area; and
determining a revised second position for the vehicle based at least in part on the sensor data and at least in part on the second position estimate.

7. The system of claim 1, the operations further comprising:
generating, by the first vehicle position generator, the first position estimate using map data associated with the first map area;
receiving, by the first vehicle position generator, the first map change message; and
after receiving the first map change message, generating, by the first vehicle position generator, an additional position estimate using map data associated with the second map area.

8. The system of claim 1, the operations further comprising:
receiving an additional position estimate from the first vehicle position generator, the additional position estimate being in an additional map area of the plurality of map areas, the additional map area being different than the second map area; and
sending an additional map change message to a second vehicle position generator executing at the vehicle computing system, the additional map change message indicating the additional map area.

9. The system of claim 1, the operations further comprising:
receiving a first additional position estimate from the first vehicle position generator, the first additional position estimate being in the second map area and comprising a first position estimate error;
receiving a second additional position estimate from a second vehicle position generator executing at the vehicle computing system, the second additional position estimate being in an additional map area different than the second map area and comprising a second position estimate error;
determining that the second position estimate error is less than the second position estimate error; and sending an additional map change message to the first vehicle position generator, the additional map change message indicating the additional map area.

10. A method for locating a vehicle, comprising:
accessing, by a vehicle computing system, a first position for the vehicle at a first time, wherein the first position is in a first map area of a plurality of map areas, and wherein the first position is based at least in part on a first position estimate generated by a first vehicle position generator executing at the vehicle computing system;
accessing, by the vehicle computing system, a second position for the vehicle at a second time after the first time, wherein the second position is based at least in part on the first position of the vehicle and at least in part on sensor data describing a motion of the vehicle after the first time;
determining, by the vehicle computing system, that the second position of the vehicle is in a second map area of the plurality of map areas; and
sending, by the vehicle computing system, a first map change message to the first vehicle position generator, the first map change message indicating the second map area.

11. The method of claim 10, further comprising:
receiving, by the first vehicle position generator, first remote sensor data describing an environment of the vehicle;
receiving, by the first vehicle position generator, the first map change message; and
matching, by the first vehicle position generator, the first remote sensor data to first map data describing the second map area to generate a second position estimate.

12. The method of claim 11, further comprising sending a second map change message to a second vehicle position generator executing at the vehicle computing system, the second map change message also indicating the second map area.

13. The method of claim 12, further comprising:
receiving, by the second vehicle position generator, second remote sensor data describing the environment of the vehicle;
receiving, by the second vehicle position generator, the first map change message; and
matching, by the second vehicle position generator, the second remote sensor data to second map data describing the second map area to generate a second position estimate, the second map data describing the second map area being different than the first map data describing the second map area.

14. The method of claim 10, wherein the sensor data comprises at least one of comprises global positioning system (GPS) data describing the vehicle, or motion sensor data describing motion of the vehicle.

15. The method of claim 10, further comprising:
receiving from the first vehicle position generator, a second position estimate associated with the second time, wherein the second position estimate is in the second map area; and
determining a revised second position for the vehicle based at least in part on the sensor data and at least in part on the second position estimate.

16. The method of claim 10, further comprising:
generating, by the first vehicle position generator, the first position estimate using map data associated with the first map area;

receiving, by the first vehicle position generator, the first map change message; and after receiving the first map change message, generating, by the first vehicle position generator, an additional position estimate using map data associated with the second map area.

17. The method of claim 10, further comprising:

receiving an additional position estimate from the first vehicle position generator, the additional position estimate being in an additional map area of the plurality of map areas, the additional map area being different than the second map area; and sending an additional map change message to a second vehicle position generator executing at the vehicle computing system, the additional map change message indicating the additional map area.

18. The method of claim 10, further comprising:

receiving a first additional position estimate from the first vehicle position generator, the first additional position estimate being in the second map area and comprising a first position estimate error;

receiving a second additional position estimate from a second vehicle position generator executing at the vehicle computing system, the second additional position estimate being in an additional map area different than the second map area and comprising a second position estimate error;

determining that the second position estimate error is less than the second position estimate error; and sending an additional map change message to the first vehicle position generator, the additional map change message indicating the additional map area.

19. A non-transitory computer-readable medium comprising instructions thereon that, when executed by a vehicle computing system cause the vehicle computing system to perform operations comprising:

accessing a first position for a vehicle at a first time, wherein the first position is in a first map area of a plurality of map areas, and wherein the first position is based at least in part on a first position estimate generated by a first vehicle position generator executing at the vehicle computing system;

accessing a second position for the vehicle at a second time after the first time, wherein the second position is based at least in part on the first position of the vehicle and at least in part on sensor data describing a motion of the vehicle after the first time;

determining that the second position of the vehicle is in a second map area of the plurality of map areas; and sending a first map change message to the first vehicle position generator, the first map change message indicating the second map area.

20. The computer-readable medium of claim 19, the operations further comprising:

sending a second map change message to a second vehicle position generator executing at the vehicle computing system, the second map change message also indicating the second map area;

receiving, by the second vehicle position generator, second remote sensor data describing an environment of the vehicle; and matching, by the second vehicle position generator, the second remote sensor data to map data describing the second map area to generate a second position estimate.

* * * * *